United States Patent
Grondin

(10) Patent No.: US 11,224,264 B2
(45) Date of Patent: Jan. 18, 2022

(54) MULTI-DENSITY SOLE ELEMENTS, AND SYSTEMS AND METHODS FOR MANUFACTURING SAME

(71) Applicant: New Balance Athletics, Inc., Boston, MA (US)

(72) Inventor: Jonathan Grondin, Waltham, MA (US)

(73) Assignee: New Balance Athletics, Inc., Boston, MA (US)

(*) Notice: Subject to any disclaimer, the term of this patent is extended or adjusted under 35 U.S.C. 154(b) by 34 days.

(21) Appl. No.: 16/297,044

(22) Filed: Mar. 8, 2019

(65) Prior Publication Data

US 2019/0261736 A1     Aug. 29, 2019

Related U.S. Application Data

(60) Continuation of application No. 15/019,138, filed on Feb. 9, 2016, now Pat. No. 10,238,172, which is a
(Continued)

(51) Int. Cl.
*A43B 13/18* (2006.01)
*B29D 35/12* (2010.01)
(Continued)

(52) U.S. Cl.
CPC .......... *A43B 13/181* (2013.01); *A43B 1/0027* (2013.01); *A43B 13/04* (2013.01);
(Continued)

(58) Field of Classification Search
CPC ............................ A43B 13/125; A43B 13/188
See application file for complete search history.

(56) References Cited

U.S. PATENT DOCUMENTS

| 2,772,196 A | 11/1956 | Pooley |
| 3,591,882 A | 7/1971 | Pearsall |

(Continued)

FOREIGN PATENT DOCUMENTS

| CN | 1452927 A | 11/2003 |
| CN | 2884957 Y | 4/2007 |

(Continued)

OTHER PUBLICATIONS

Chinese Office Action in CN201810717345.7, dated Jun. 10, 2020 10 pages.
(Continued)

*Primary Examiner* — Robert A Vetere
(74) *Attorney, Agent, or Firm* — Goodwin Procter LLP

(57) ABSTRACT

The invention relates to sole elements for articles of footwear, and systems and methods for manufacturing same. One embodiment of the invention includes a method of manufacturing a sole element for an article of footwear including the steps of forming a sole element preform, inserting the sole element preform into a press mold cavity, and press-forming the sole element preform within the press mold cavity to form a unitary finished sole element comprising a first region having a first density and hardness and a second region having a second density and hardness different from the first density and hardness.

20 Claims, 8 Drawing Sheets

Related U.S. Application Data division of application No. 13/835,859, filed on Mar. 15, 2013, now Pat. No. 9,282,785.

(51) Int. Cl.
    *A43B 13/12*           (2006.01)
    *A43B 1/00*            (2006.01)
    *A43B 13/04*           (2006.01)

(52) U.S. Cl.
    CPC .......... *A43B 13/125* (2013.01); *A43B 13/187* (2013.01); *A43B 13/188* (2013.01); *B29D 35/122* (2013.01); *B29D 35/128* (2013.01)

(56) References Cited

U.S. PATENT DOCUMENTS

| | | |
|---|---|---|
| 3,766,669 A | 10/1973 | Pearsall |
| 4,364,188 A | 12/1982 | Turner et al. |
| 4,502,234 A | 3/1985 | Schaefer et al. |
| 4,597,195 A | 7/1986 | Dananberg |
| 4,608,988 A | 9/1986 | Dananberg |
| 4,730,402 A | 3/1988 | Norton et al. |
| 4,798,010 A | 1/1989 | Sugiyama et al. |
| 4,823,483 A | 4/1989 | Chapnick |
| 4,836,814 A | 6/1989 | Bambara et al. |
| 4,864,739 A | 9/1989 | Maestri |
| 5,433,022 A | 7/1995 | Lo et al. |
| 5,572,805 A | 11/1996 | Giese et al. |
| 6,061,929 A | 5/2000 | Ritter |
| 6,536,137 B1 | 3/2003 | Celia |
| 6,691,432 B2 | 2/2004 | Masseron |
| 6,789,331 B1* | 9/2004 | Ellis, III .................. A43B 5/00 36/114 |
| 7,082,704 B2 | 8/2006 | Throneburg et al. |
| 7,200,955 B2 | 4/2007 | Foxen |
| 7,418,792 B2 | 9/2008 | Pai |
| 7,464,428 B2 | 12/2008 | Norton |
| 2003/0115776 A1 | 6/2003 | Chu |
| 2003/0192202 A1 | 10/2003 | Schoenborn et al. |
| 2004/0250447 A1 | 12/2004 | Ellis |
| 2005/0166423 A1 | 8/2005 | Norton |
| 2006/0277799 A1 | 12/2006 | Lebo |
| 2007/0175068 A1 | 8/2007 | Lin |
| 2007/0220778 A1* | 9/2007 | Fusco .................. A43B 13/125 36/30 R |
| 2009/0013558 A1 | 1/2009 | Hazenberg et al. |
| 2009/0019729 A1* | 1/2009 | Nakano .................. A43B 7/14 36/91 |
| 2010/0186264 A1 | 7/2010 | Cook et al. |
| 2011/0277355 A1 | 11/2011 | Fahmi et al. |
| 2011/0283560 A1* | 11/2011 | Portzline .............. A43B 13/186 36/31 |

FOREIGN PATENT DOCUMENTS

| | | |
|---|---|---|
| CN | 102320099 A | 1/2012 |
| CN | 102281784 B | 5/2014 |
| CN | 102970891 B | 5/2016 |

OTHER PUBLICATIONS

Translation of First Search Report in Chinese Office Action for CN201810717345.7, dated Jun. 10, 2020, 2 pages.
International Search Report and Written Opinion in PCT/US2014/025983 dated Jan. 22, 2015 13 pages.
International Preliminary Report on Patentability in PCT/US2014/025983 dated Sep. 15, 2015 12 pages.

\* cited by examiner

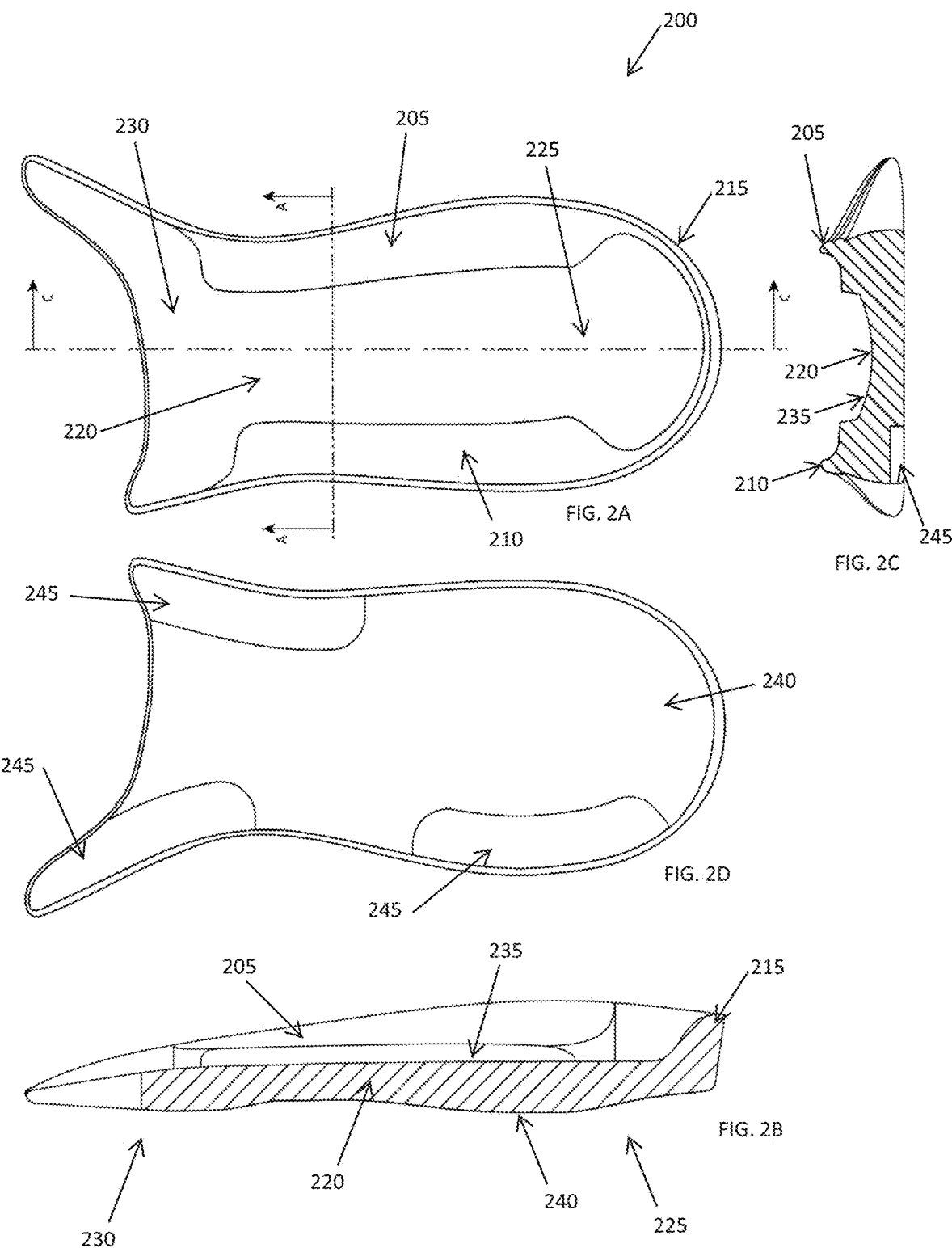

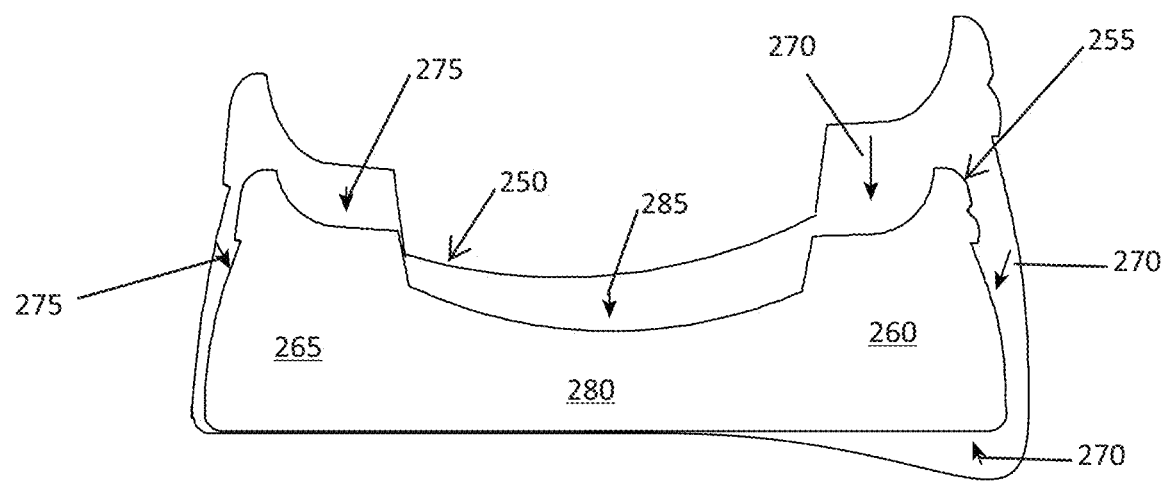
FIG. 3
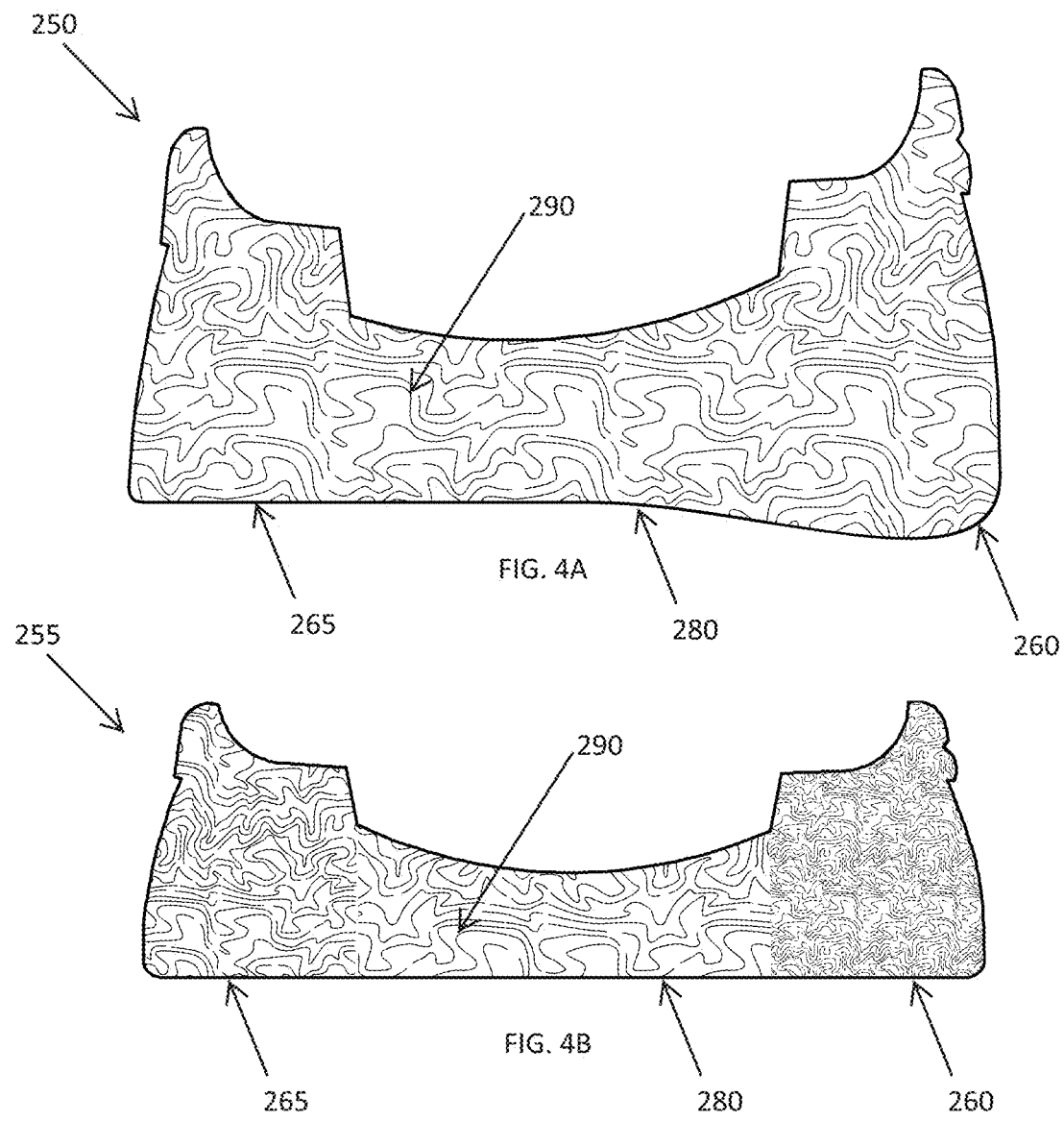
FIG. 4A
FIG. 4B

MULTI-DENSITY SOLE ELEMENTS, AND SYSTEMS AND METHODS FOR MANUFACTURING SAME

CROSS-REFERENCE TO RELATED APPLICATIONS

This application is a continuation application of U.S. patent application Ser. No. 13/835,859 filed on Mar. 15, 2013 (now U.S. Pat. No. 9,282,785) and a continuation application of U.S. patent application Ser. No. 15/019,138 filed on Mar. 9, 2016, the entire contents of which applications are incorporated herein by reference in their entireties.

FIELD OF THE INVENTION

The present invention relates generally to the field of footwear, and more particularly to articles of footwear having variable density or hardness sole elements, and related systems and methods for designing and manufacturing same.

BACKGROUND OF THE INVENTION

Many sports induce high levels of stress in the various joints of an athlete's feet and legs that may, over time, result in a risk of serious fatigue and injury to one or more joints and/or muscles of the body (e.g., knee and/or cartilage injuries), which can reduce the performance level of the athlete and even make it impossible for them to compete. Example sports include, but are not limited to, track and field events such as running, hurdling, etc., and sports requiring abrupt changes in direction such as soccer, rugby, tennis, squash, racquetball, badminton, football, baseball, field hockey, lacrosse, cricket, and basketball.

Providing appropriate levels of support and cushioning within a sole of the shoe can be highly beneficial in reducing the risk of injury due to overstressing of the foot and/or leg of an athlete during such athletic activity. As a result, shoes are often fitted with support elements to control and reduce the effects of potentially damaging body movements during a gait cycle or cutting motion. For example, support elements are often incorporated into footwear to assist in preventing unwelcome movement of the ankle through over-pronation or over-supination. Pronation is a rotation or turning of the foot from a lateral side (i.e., the outer side) of the foot to a medial side (i.e., the inner side) of the foot. During a standard gait cycle the foot typically contacts the ground at first with the outer (i.e., lateral) part of the heel, after which the ankle rotates towards the medial side as weight is shifted to the midfoot and forefoot portions of the foot prior to pushing-off. Supination is a corresponding turning of the ankle from the medial side to the lateral side of the foot. Over-pronation and over-supination can result in significant stress being placed on the ankle and knee of the athlete. In general, support elements within a shoe to prevent over-pronation/supination involve relatively complicated arrangements of material and support mechanisms that often add significant cost, complexity, and weight to the footwear.

While methods of manufacture to produce more simple and cost effective sole units with stability functionality incorporated therein have been suggested (see, for example, U.S. Pat. No. 7,464,428, the disclosure of which is incorporated herein by reference in its entirety), there is still a need for improved sole elements for providing controlled and targeted support and cushioning for an article of footwear without the need for complicated and expensive manufacturing methods and parts.

SUMMARY OF THE INVENTION

The present invention is directed towards customized footwear (and also apparel and/or sporting equipment) and elements thereof, and related systems and methods for designing and manufacturing same, with customized elements adapted to provide targeted levels of support and cushioning for a broad range of athletes and athletic activities.

One aspect of the invention includes a method of manufacturing a sole element for an article of footwear. The method includes the steps of forming a sole element preform, inserting the sole element preform into a press mold cavity, and press-forming the sole element preform within the press mold cavity to form a unitary finished sole element. The unitary finished sole element may include a first perimeter region comprising a first maximum density and/or hardness, a second perimeter region comprising a second maximum density and/or hardness, a third perimeter region comprising a third maximum density and/or hardness, and a central region comprising a fourth maximum density and/or hardness extending between at least a portion of the first perimeter region, second perimeter region, and third perimeter region.

In one embodiment, the first perimeter region includes at least a portion of a lateral side region of the sole element, the second perimeter region includes at least a portion of a medial side region of the sole element, and the third perimeter region includes at least a portion of a lateral heel region of the sole element. The third maximum density and/or hardness may be less than at least one of the first maximum density and/or hardness or the second maximum density and/or hardness. The sole element preform may include, or consist essentially of, a polymeric material such as, but not limited to, ethylene vinyl acetate.

Forming the sole element preform may include foaming unfoamed polymeric material in a first (or preform) mold cavity. The press mold cavity may have a volume smaller than that of the first mold cavity, with the step of inserting the sole element preform into the press mold requiring over-stuffing the sole element preform into the press form cavity.

In one embodiment the unfoamed polymer material further includes at least one coloring material. Upon foaming the unfoamed polymeric material this coloring material may be unevenly distributed throughout the sole element preform and can, in certain embodiments, provide a visual indication representative of a differentiation in density and/or hardness in different regions of the finished sole element.

In one embodiment the first maximum density and/or hardness is less than the second maximum density and/or hardness, the third maximum density and/or hardness is less than both the first maximum density and/or hardness and the second maximum density and/or hardness, and the fourth maximum density and/or hardness is less than at least one of the first maximum density and/or hardness and the second maximum density and/or hardness. At least one of the first perimeter region, second perimeter region, third perimeter region, and/or central region may have a density and/or hardness that varies in at least one direction. The finished sole element may be adapted to form at least a heel portion of a midsole of an article of footwear.

Another aspect of the invention includes a sole element for an article of footwear. The sole element includes a first perimeter region having a first maximum density and/or hardness, a second perimeter region having a second maximum density and/or hardness, a third perimeter region having a third maximum density and/or hardness, and a central region having a fourth maximum density and/or hardness and extending between at least a portion of the first perimeter region, second perimeter region, and third perimeter region. Each of the first perimeter region, second perimeter region, third perimeter region, and central region may be formed as a unitary construction (i.e., as a single integrated part form as one from a single material, or single group of materials).

In one embodiment the first perimeter region includes at least a portion of a lateral side region of the sole element, the second perimeter region includes at least a portion of a medial side region of the sole element, and the third perimeter region includes at least a portion of a lateral heel region of the sole element. The third maximum density and/or hardness may be less than at least one of the first maximum density and/or hardness or the second maximum density and/or hardness. The unitary construction may be formed from a polymeric material such as, but not limited to, ethylene vinyl acetate. In one embodiment the polymeric material includes at least one coloring material which may provide a visual indication representative of a differentiation in density and/or hardness in different regions of the sole element.

In one embodiment the first maximum density and/or hardness is less than the second maximum density and/or hardness, the third maximum density and/or hardness is less than both the first maximum density and/or hardness and the second maximum density and/or hardness, and the fourth maximum density and/or hardness is less than at least one of the first maximum density and/or hardness and the second maximum density and/or hardness. At least one of the first perimeter region, second perimeter region, third perimeter region, and/or central region may include a density and/or hardness that varies in at least one direction. The sole element may be adapted to form at least a heel portion of a midsole of an article of footwear.

Another aspect of the invention includes a sole element for an article of footwear, the sole element including a first sole component and a second sole component. The first sole component may include, or consist essentially of, a first material, the first sole component having an upper surface and a lower surface, the upper surface of the first sole element forming at least a first portion of an upper surface of the sole element. The second sole component may include, or consist essentially of, a second material, the second sole component having an upper surface and a lower surface, and at least a first portion of the upper surface of the second component adapted to mate to at least a portion of the lower surface of the first sole component. The second component may include a first region having a first maximum density and/or hardness, and a second region having a second maximum density and/or hardness different from the first maximum density and/or hardness.

In one embodiment the first region of the second sole component includes at least one lateral extension extending upwards around at least a portion of a lateral side of the first sole component and having an upper surface adapted to extend to a same height as the upper surface of the first sole element to form a second portion of an upper surface of the sole element. The second region may include at least one medial extension extending upwards around at least a portion of medial side of the first sole component and having an upper surface adapted to extend to a same height as the upper surface of the first sole element to form a second portion of an upper surface of the sole element. In one embodiment the second sole component further comprises a heel region comprising a third maximum density and/or hardness different from at least one of the first maximum density and/or hardness and the second density and/or hardness.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2A is a top view of a sole element for a heel and midfoot region of a shoe sole, in accordance with one embodiment of the invention;

FIG. 2B is a sectional side view of the sole element of FIG. 2A through Section C-C;

FIG. 2C is a sectional end view of the sole element of FIG. 2A through Section A-A;

FIG. 2D is a bottom view of the sole element of FIG. 2A;

FIG. 3 is a schematic end view of a sole element for a shoe before and after press molding, in accordance with one embodiment of the invention;

FIG. 4A is a schematic end view of a sole element for a shoe having a coloring element distributed therethrough before press molding, in accordance with one embodiment of the invention;

FIG. 4B is a schematic side view of the sole element of FIG. 4A after press molding;

DETAILED DESCRIPTION

Figure 1A:
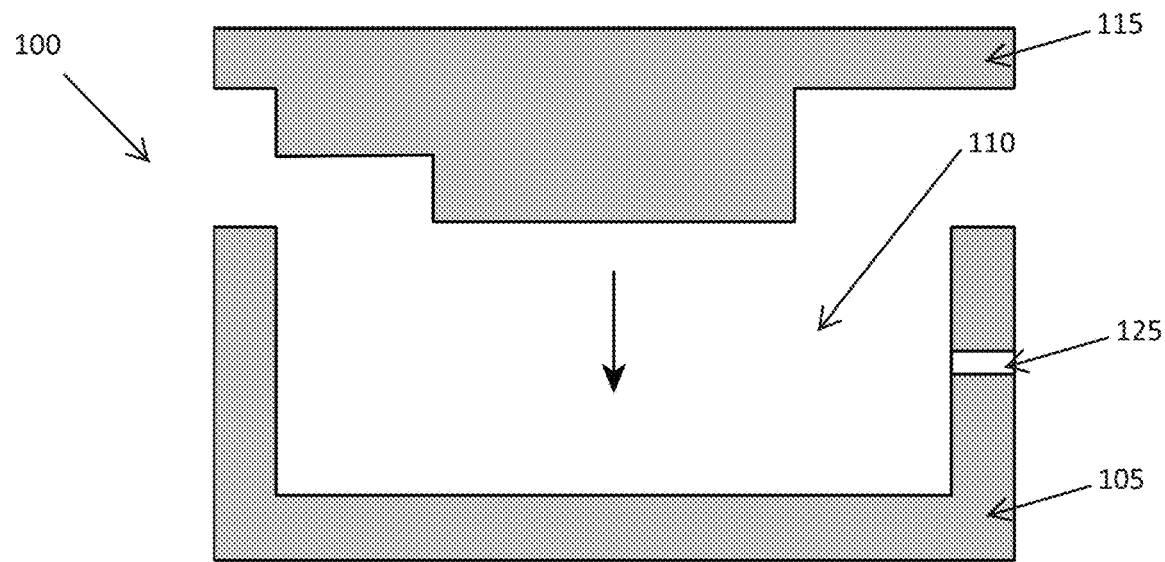
FIG. 1A is a schematic view of a preform mold cavity for forming a sole element preform, in accordance with one embodiment of the invention.

The invention described herein relates to systems and methods for forming polymeric foamed articles having regions of differing physical properties (e.g., hardness and/or density) for use, for example, in footwear. The systems and methods described herein can be used to produce components such as, but not limited to, soles, or components therefor, for footwear. More particularly, the systems and methods described herein may be used to produce multi-density and/or hardness foamed parts that may form an insole, midsole, and/or outsole of a shoe, or form a sole element for integration into an insole, midsole, and/or outsole of the shoe (e.g., through bonding to, and/or mechanical attachment to, another midsole element).

Differing physical properties of interest for different regions within the component include material density and material hardness. Material density, i.e., the mass of the material per unit volume, provides an indication of how dense the material is, with denser materials generally providing more support and less flexibility and cushioning, while less dense materials provide less resistance and therefore a greater level of cushioning and flexibility. Hardness, and more specifically indentation hardness (i.e., a measure of the resistance of a sample to material deformation due to a constant compression load from a sharp object) provides an indication of the resistance to deformation of a material, with a higher hardness material providing more support and less flexibility and cushioning, while lower hardness materials provide less resistance and therefore a greater level of cushioning and flexibility. The methods and systems described herein will provide for sole components having multi-hardness and multi-density regions, with the higher hardness regions corresponding to the higher density regions.

In various embodiments the methods and systems described herein can be used to produce multi-density/hardness parts for use in any number of products. For example, such parts may form the sole, or a portion of a sole, of an article of footwear and/or form at least a portion of an upper of an article of footwear. The multi-density/hardness parts can also be integrated into garments for an upper and/or lower body of a wearer, with the polymeric material being useful, for example, in providing protective coverings and padding that is integrated into the garment. For example, in some embodiments the multi-density/hardness parts can be arranged so as to provide foamed protective elements for garments or sporting accessories. The multi-density/hardness parts can also be used in products such as, but not limited to, protective sports accessories (e.g., elbow pads, shin pads, head protectors, etc.), suitcases and other carrying bags, or the like.

One embodiment of the invention relates to a method of manufacturing a multi-density, multi-hardness, sole element (e.g., a multi-density "blocker" element) for incorporation into a midsole of an article of footwear. The method includes the steps of forming a sole element preform, inserting the sole element preform into a press mold cavity, and press-forming the sole element preform within the press mold cavity to form a finished sole element having a unitary structure including multiple regions of differing density and hardness.

The sole element preform may be manufactured from any appropriate technique and, for example, may be manufactured from molding methods such as, but not limited to, expansion molding, die-cutting, sculpting of foamed material, and/or compression molding. For example, the sole element preform may be manufactured by providing a preform mold including at least one cavity, inserting unfoamed polymeric material into the cavity to partially fill the cavity with unfoamed polymeric material, and sealing the mold. The unfoamed polymeric material may then be foamed by the preform mold to form a preform element having any required shape, size, and material properties (e.g., density) depending upon the shape and volume of the preform mold cavity, the volume of unfoamed polymeric material inserted into the cavity, and/or the properties of the polymeric material being foamed.

The polymeric material may include, or consist essentially of, polymers, elastomers, and/or thermoplastics. For example, the polymeric material may be ethylene vinyl acetate (EVA), EVA copolymers, polyethylene (PE), chlorinated polyethylene (CPE), polyurethane (PU), thermoplastic polyurethane (TPU), DuPont™ Surlyn®, blown rubber, or thermoplastic rubber (TPR). In one example embodiment the polymeric material is a ground-contact EVA (i.e., an EVA formulated specifically to provide appropriate performance, wear, and durability characteristics to allow it to be used as the ground-contacting surface of a shoe sole).

In various embodiments a blowing agent may be introduced into the unfoamed polymeric material prior to foaming so as to provide a means of foaming the polymeric material. The blowing agent may be introduced into the unfoamed polymeric material mixture with any appropriate blowing agent level. The blowing agent may include, or consist essentially of, any appropriate type of physical or chemical blowing agent known to those of ordinary skill in the art such as, but not limited to, nitrogen, carbon dioxide, hydrocarbons (e.g., propane), chlorofluorocarbons, noble gases and/or mixtures thereof. In one example embodiment, the blowing agent comprises, or consists essentially of, nitrogen. The blowing agent may be supplied in any flowable physical state such as a gas, a liquid, or a supercritical fluid (SCF). Alternatively, the blowing agent may be supplied in the form of a pelletized solid. According to one embodiment, a blowing agent source provides a blowing agent (e.g., nitrogen) that is in a supercritical fluid state upon injection into an extruder for extruding material into a preform mold. In one embodiment a chemical blowing agent (e.g., azodicarbonamide or modified-azodicarbonamide) in liquid form can be mixed with the unfoamed polymeric material and thereafter activated by heating to a temperature at or above its activation temperature.

The blowing agent may be dissolved, or otherwise mixed, into the unfoamed polymeric material such that it remains in a stable condition until a specific condition is met, at which time it activates, comes out of solution, decomposes, gasifies, or otherwise initiates foaming to nucleate a plurality of microcell sites and thereby foam the unfoamed polymeric material. For example, the blowing agent may be selected to activate/come out of solution and foam the unfoamed polymeric material when a set temperature is reached and/or when a set pressure is reached.

In one embodiment the unfoamed polymeric material with the blowing agent dissolved therein can be held at an elevated pressure, with the blowing agent activating when the pressure under which the unfoamed polymeric material is held is dropped (e.g., by expanding or opening ("cracking") a mold cavity in which the unfoamed polymeric material is held). For example, the unfoamed polymeric material with the blowing agent mixed therein (e.g., a supercritical fluid blowing agent) can be held at an elevated temperature and pressure within an upstream mixing and injection system and in one or more injection channels connecting the mixing and injection system with the mold cavity (or cavities), with foaming automatically initiating as or shortly after the material exits the injection channel(s) and enters the mold cavity (or cavities).

Alternatively, unfoamed polymeric material with an embedded blowing agent is inserted into the preform mold cavity (for example in liquid form or in solid pellet form). The mold cavity is thereafter closed and heated to a temperature and/or pressure sufficient to activate the blowing agent, after which the unfoamed material can be foamed (e.g., by "cracking" the mold or by retracting a retractable wall in the mold). In alternative embodiments any appropriate technique for forming a foamed preform from unfoamed polymeric material may be utilized.

Once the foamed polymeric material preform has been created, the preform can be inserted into a press-mold cavity to undergo press-form molding to create the finished part. The structure and action of the press-mold can be carefully selected to provide a greater degree of compression to certain regions of the preform, and a lesser degree of compression to other regions of the preform, to produce a finished part having different densities in different regions. The press-form mold may include one or more wall that presses down into the press-form mold cavity to reduce the volume within the cavity and compress the foamed polymeric material preform located therein. The walls may be actuated to compress the preform through any appropriate mechanical, pneumatic, hydraulic, electromagnetic, and/or other appropriate mechanism.

An example method of manufacturing a multi-density part is shown in FIGS. 1A through 1G. In this embodiment, a preform mold 100 is provided with a first mold portion 105 forming a mold cavity 110, and a second mold portion 115 for covering the cavity 110 to seal (or partially seal) the cavity 110 from the surrounding atmosphere. The second mold portion 115 can be detachable from the first mold portion 105 or be pivotably, or otherwise movably, attached to the first mold portion 105. The second mold portion 115 may be clamped, screwed, or otherwise detachably held to the first mold portion 105 through any appropriate mechanical, pneumatic, hydraulic, and/or electromagnetic clamping system to ensure that an appropriate seal within the cavity 110 is maintained during the molding process. In an alternative embodiment the mold 100 may have additional and/or differently shaped mold portions that can mate together in any appropriate manner and/or be oriented in any appropriate manner.

Figure 1B:
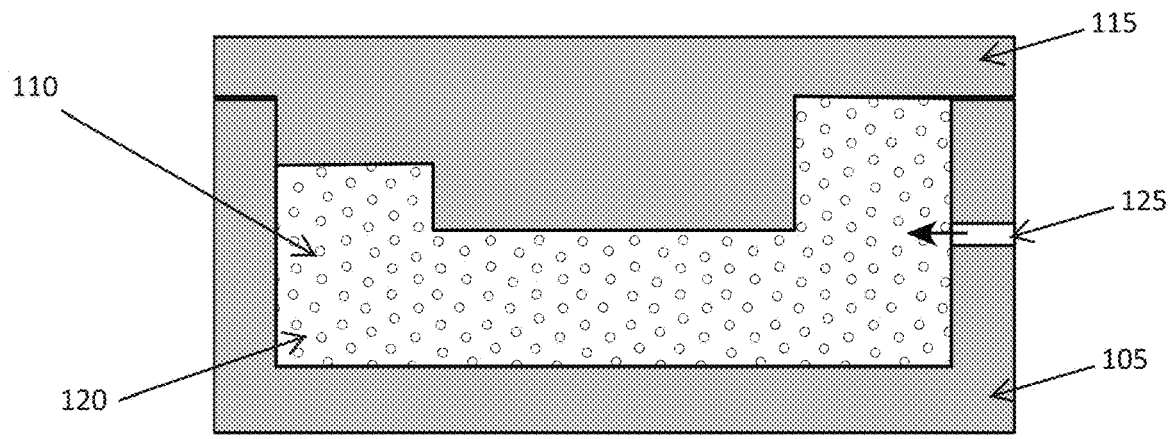
FIG. 1B is a schematic view of a sole element preform being formed in the preform mold cavity of FIG. 1A.

The cavity 110 is adapted to receive a volume of unfoamed polymeric material 120 (e.g., a volume of unfoamed EVA), as shown in FIG. 1B. The unfoamed polymeric material 120 may be inserted into the cavity 110 in solid or liquid form. For example, the unfoamed polymeric material 120 may be injected into the cavity 110 in liquid form through one or more injection ports 125. Alternatively, the unfoamed polymeric material 120 may be inserted into the cavity 110 as a plurality of small pellets of unfoamed material (with, for example, a blowing agent encapsulated therein) that are thereafter heated and melted into a liquid within the cavity 110 in order to activate the blowing agent and foam the unfoamed polymeric material 120. Pellets of unfoamed polymeric material 120 may be inserted into the cavity 110 by hand, or be held in a hopper and manually or automatically released from the hopper into the cavity 110 prior to foaming.

Figure 1C:
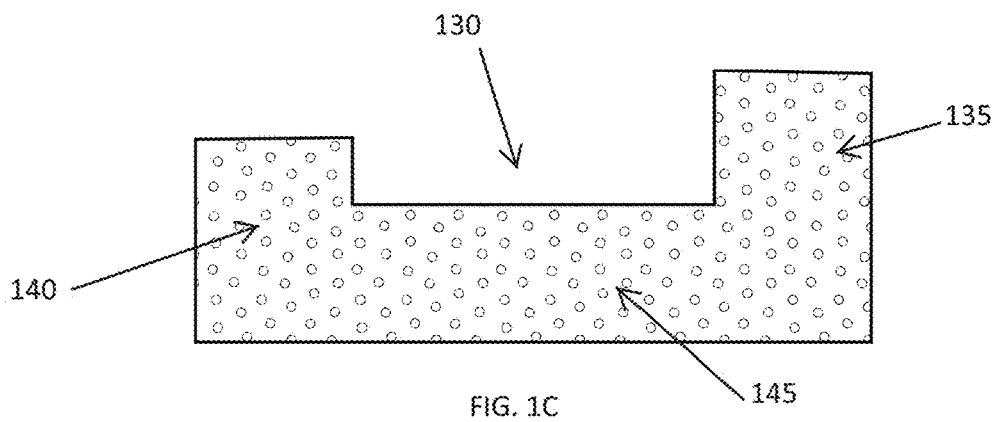
FIG. 1C is a sole element preform as formed by the preform mold cavity of FIG. 1A.

Once the unfoamed polymeric material 120 has been inserted into the mold cavity 110 the mold 100 can induce foaming of the polymeric material, through any appropriate foaming method (e.g., through expansion or crack molding), to produce a foamed polymeric preform 130. The preform can then be press-molded to produce a finished multi-density part. The perform 130 may be asymmetrically formed, as shown in FIGS. 1B and 1C with a first extension 135, a second extension 140, and a base portion 145. The first extension 135 extends further from the base portion 145 than second extension 140, and therefore contains a larger volume of material than second extension 140. In various embodiments the perform 130 may be of any size and shape and may include and number and/or shape of extensions, protrusions, cavities, and or other appropriate shaping elements, depending upon the specific finished part being formed and the specific density distribution required of the finished part.

The resulting foamed preform 130 can then be inserted into a second mold 150 (i.e., a press-form mold) for press-forming into a finished part. The press-form mold 150 may include a first mold portion 155 forming a press-form mold cavity 160, and a second mold portion 165 for covering the cavity 160 to seal (or partially seal) the cavity 160 from the surrounding atmosphere. In one embodiment the second mold 150 may form a sealed, or substantially sealed, press-form mold cavity 160. In an alternative embodiment the second mold 150 forms a press-form mold cavity 160 that is vented to the surrounding atmosphere through one or more venting channels, or through one or more spaces or cracks between different mold components. In various embodiments the second mold 150 may be thermally controlled (e.g., heated and/or cooled as required) to assist in the pressing and setting of the finished part 180.

Figure 1D:
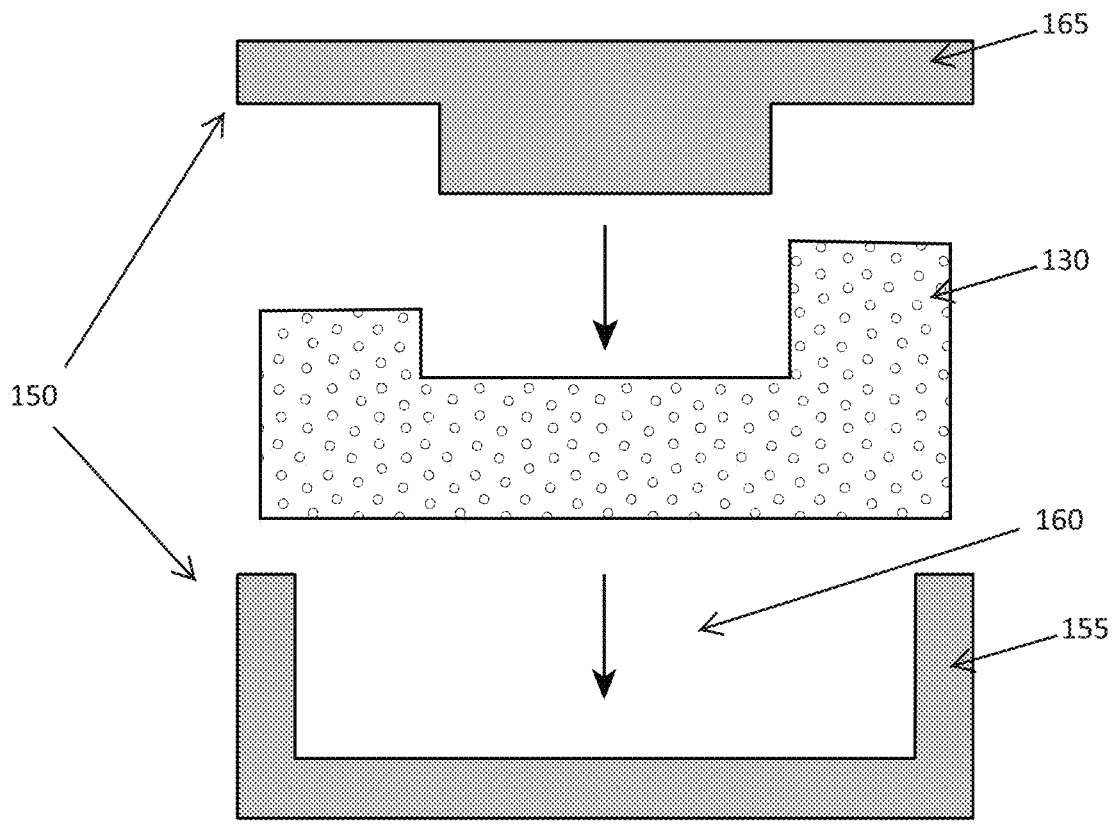
FIG. 1D is a schematic view of the sole element preform of FIG. 1C being inserted into a press mold cavity, in accordance with one embodiment of the invention.

In one embodiment, as shown in FIG. 1D, the preform 130 can have at least one dimension (e.g., a width and/or height) larger than that of the press-form mold cavity 160 into which it is placed. As a result, the preform 130 must be forced (i.e., "over-stuffed") into the cavity 160 such that the preform 130 is held in a compressed state within the cavity 160 prior to press-forming. This over-stuffing may be beneficial in controlling and supporting the creation of localized density changes after compressing the foamed material into a finished part 180. In an alternative embodiment the preform 130 may be shaped and sized to fit substantially exactly into the press-form mold cavity 160 without the need for over-stuffing, or may, in one embodiment have at least one dimension smaller than that of the press-form mold cavity 160 (so that the preform 130 fits within the cavity 160 with a space between the preform 130 and at least one wall of the cavity 160).

Figure 1E:
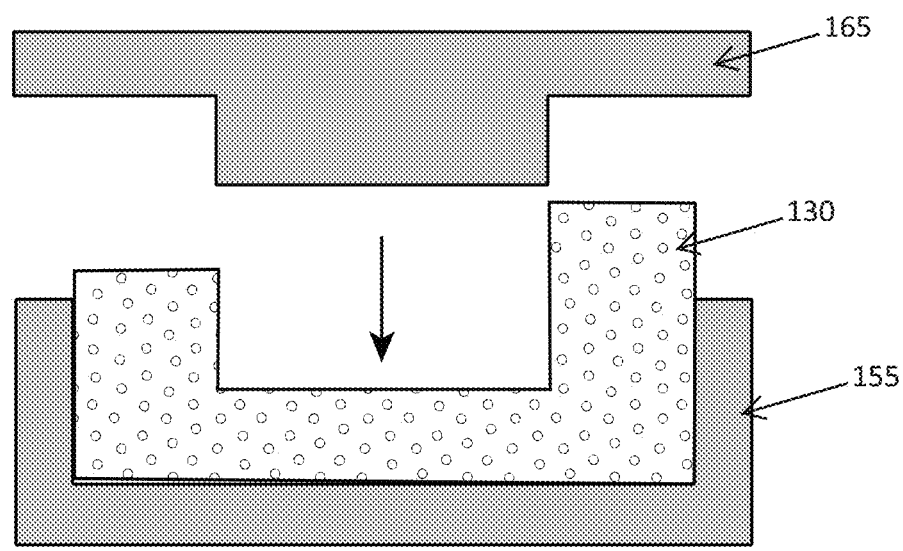
FIG. 1E is a schematic view of the sole element preform after insertion into the press mold cavity of FIG. 1D.
Figure 1F:
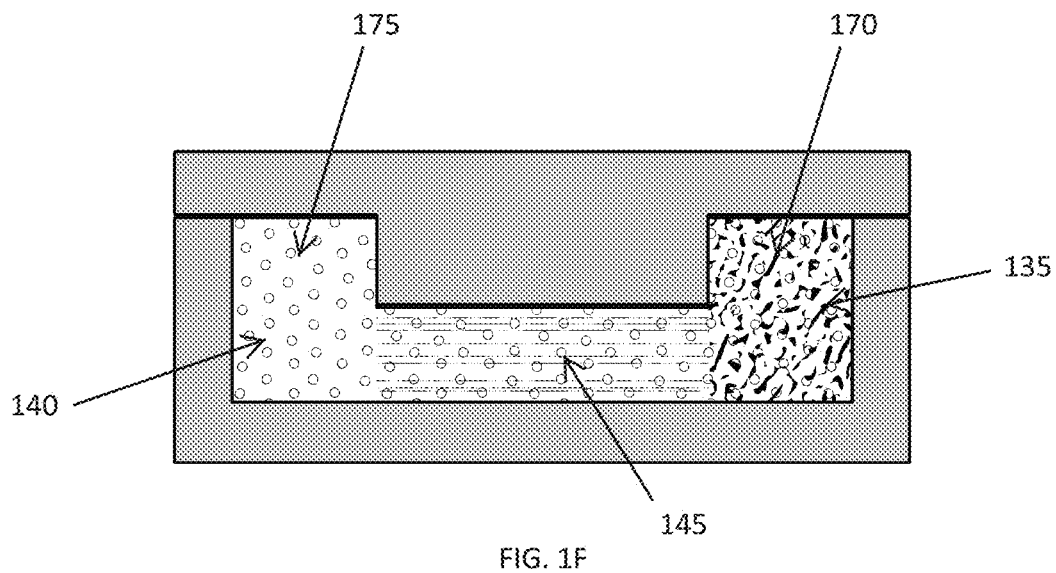
FIG. 1F is a schematic view of a sole element being press formed in the press mold cavity of FIG. 1D.

Once the preform 130 has been placed within the cavity 160 the mold 150 is closed, as shown in FIGS. 1E and 1F, and the preform is compressed to form a finished part 180. The mold 150 may be closed by forcing the first mold portion 155 into contact with the second mold portion 165 through any appropriate mechanical, pneumatic, hydraulic, and/or electromagnetic mechanism.

In one embodiment the first mold portion 155 and the second mold portion 165 are shaped and sized to form a press-form mold cavity 160 having a different shape from that of the preform mold cavity 110, as shown in FIG. 1F. As a result, upon closing the press-form mold 150 different regions of the preform 130 undergo different levels of compression depending upon the difference in volume between that portion of the preform 130 and the region of the press-form mold cavity 160 into which it is placed. For example, in the embodiment shown in FIGS. 1E and 1F the press-form mold cavity 160 is symmetrically shaped with a first extended cavity portion 170 (into which the longer first extension 135 of the preform 130 is placed) having a substantially identical size and shape to a second extended cavity portion 175 (into which the shorter second extension 140 of the preform 130 is located). As a result, upon closing the mold 150 the first extension 135 will undergo a greater level of compression than the second extension 140, thereby forming a finished part 180 having a first extension 135 having a greater density and hardness than that of the second extension 140. The base portion 145 is, in the embodiment of FIGS. 1E and 1F, compressed by an amount greater than that of the second extension 140 but less than that of the first extension 135, thereby forming a base region having an intermediate density and hardness between that of the two extensions.

In various embodiments the press-form mold cavity 160 can be configured to apply any distribution of compression to any appropriate region of the preform 130, depending upon the specific geometries of the preform 130 and press-form mold cavity 160 and the specific density requirements of the finished part. In an alternative embodiment the press-form mold cavity 160 can be configured to generate the same level of compression over the entire preform 130, thereby forming a finished part having an even density distribution.

In one embodiment the polymeric material 120 includes one or more coloring elements that are unevenly (i.e., non-uniformly distributed, for example, as a web-like or marbled structure or as a distribution of discrete spots or lines) distributed within the unfoamed polymeric material 120. This may be achieved, for example, by coating one or more pellets of unfoamed polymeric material 120 with a colored dye, pigment, or paint such that the interior or the pellets of unfoamed polymeric material 120 have a first color while the outer surface of the pellets have a second color. Once this painted/coated polymeric material 120 is foamed the coloring material is non-uniformly distributed throughout the foamed perform 130 (i.e., both visible at the surface of the perform 130 and distributed throughout the interior of the perform 130). Alternatively, a non-uniform distribution of colored material (e.g., dye, paint, etc.) may be produced by mixing pellets of colored material within the unfoamed polymeric material 120 such that the colored pellets foam with the polymeric material 120 and unevenly distribute throughout the resulting foamed preform.

Figure 1G:
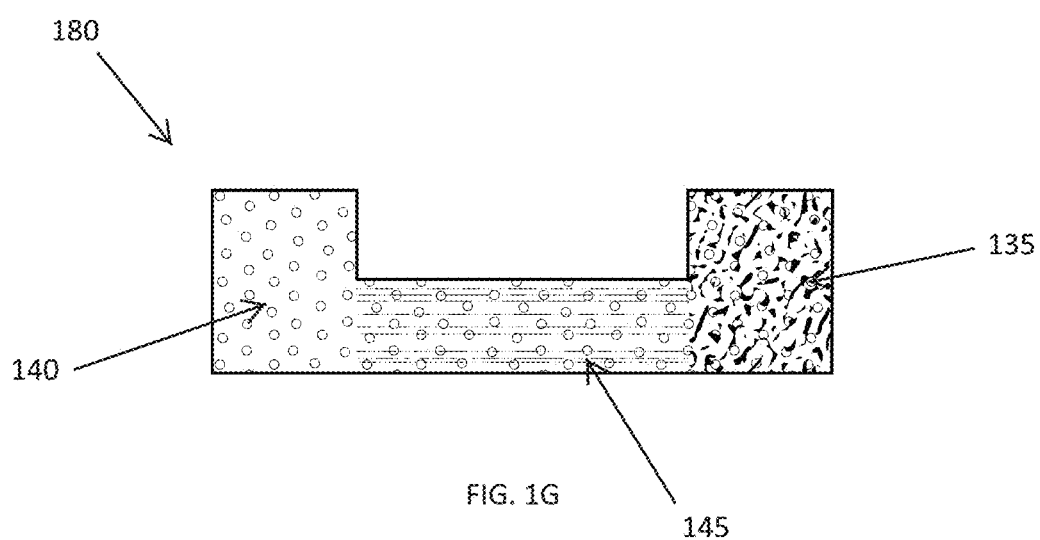
FIG. 1G is a schematic view of the finished sole element of FIG. 1F.

When the preform 130 is compressed during press-forming, the coloring elements distributed throughout the preform 130 will also be compressed, with more densely packed regions of the finished part 180 having more densely packed coloring elements. As a result, the coloring elements can provide an indication of the level of compression (and therefor the density) of the various regions of the finished part 180. A visual indication of the variation in the density distribution of the finished part 180 is shown in FIGS. 1F and 1G, with the greater coloring (i.e., the higher density of coloring element) within the first extension 135 indicating a higher density of the foamed material in that portion, and with the lesser coloring (i.e. the lower density of coloring element) within the second extension 140 indicating a lower density of the foamed material in that portion. The intermediate coloring within the base portion 145 indicates an intermediate density distribution within that region.

Use of coloring elements to provide an indication of the density of the finished part 180 may be beneficial for a number of reasons. For example, the visual indication of the density distribution provides a quick and simple confirmation that the finished part 180 was formed correctly and does include the required density profile. The visual indication of density distribution produced by the coloring element(s) can also provide a clear differentiation between similarly shaped parts having different density profiles (e.g., between two identically shaped midsole components, one with the higher density region located in a lateral side—a laterally posted insert—and one with the higher density region in the medial side—a medially posted insert). This may be helpful, for example, when assembling one of a selection of midsole components into a specific shoe for a specific purpose. In addition, as the coloring element is distributed throughout the finished part 180 (rather than merely coated onto an outer surface of the finished part) the density distribution will still be visible even if the part is cut, shaved, or otherwise post-processed. The coloring elements may also produce a unique and appealing visual aspect to a product incorporating the finished part 180.

One embodiment of the invention includes a sole component for an article of footwear (such as, but not limited to, an athletic shoe, a walking shoe, or an orthopedic shoe) formed using the methods described herein. The sole component may, for example, form a midsole of a shoe, or a portion thereof. In one embodiment the sole component may be shaped and configured to form at least a portion of a heel, a midfoot, and/or a forefoot portion of a midsole, and/or may be configured to extend over any appropriate portion of a medial lateral, and/or central region of the midsole. An example midsole component 200 for a shoe midsole is shown in FIGS. 2A through 2D.

The midsole component 200 includes a medial side portion 205, a lateral side portion 210, a heel portion 215, and a central portion 220 and is adapted to provide cushioning and support for a wearer in a shoe heel region 225 and at least part of a midfoot region 230. The medial side portion 205 and lateral side portion 210 form extensions that extend upwards from the central base portion 220 to provide perimeter support to the foot of a wearer along the medial and lateral sides of the foot. In one embodiment the heel portion 215 may also extend upwards from the central/base portion 220 to provide perimeter support to a heel of a wearer. This perimeter support may be beneficial, for example, in controlling pronation or supination in a wearer and/or providing controlled support for various regions of the foot of the wearer (e.g., a heel, an arch, and/or a plantar fascia).

The midsole component 200 includes a top surface 235 that is shaped and configured to mate with a second midsole component (e.g., a cushioning element) placed above the midsole component 200 in the full assembled sole. In an alternative embodiment the top surface 235 of the midsole component 200 may be shaped to directly provide an upper surface of the finished sole without the need for one or more additional cushioning elements there-above. The midsole component 200 also includes a bottom surface 240 that may provide a ground contacting surface for the shoe and/or that may engage with a separate outsole that is positioned below the midsole to provide a ground contacting surface for the shoe. In one embodiment the bottom surface 240 includes one or more indentations or cavities 245 for mating with one or more outsole elements. In one embodiment a bottom surface 240 and/or top surface of the midsole component 200 may include flexibility grooves or other indentations or siping.

Variations in density within the midsole component 200 can be created by forming a preform having a uniform density and thereafter selectively press-forming the preform to produce a finished part having different densities in different locations. An example cross-sectional contour of a midsole component preform 250 and finished part 255 is shown in FIG. 3. In this embodiment a medial side portion 260 is compressed by a first amount (as indicated by the arrows 270) while a lateral side portion 265 is compressed by a second, lesser, amount (as indicated by the arrows 275). A central portion 280 is compressed by a still lesser amount (as indicated by the arrow 285). As shown, the preform 250 in the medial side portion 260 is shaped such that the medial side portion 260 undergoes compression from multiple angles (including from below), while the lateral side portion 265 undergoes compression from only the top and side and the central portion 280 is compressed only in a vertical direction. In an alternative embodiment the shape and size of the various portions of the preform 250 and finished part 255 may be of any appropriate size and shape, depending upon the degree of compression required in each portion to produce finished parts 255 having any desired density distribution.

In certain embodiments one or more regions of the midsole component 200 may be compressed by a range of values within that region, thereby providing a varying density distribution within that region. For example, as shown in FIG. 3 the central portion 280 undergoes a greater degree of compression on its medial side than on its lateral side, thereby producing a variation in density across the width of the central portion 280. In an alternative embodiment one or more regions can be configured to have a relatively, or exactly, constant density throughout that region.

As described above, coloring elements may be distributed throughout the preform in order to produce a visual indication of the density distribution of the finished part after press-forming. An example midsole component preform 250 having colored material 290 unevenly distributed therethrough is shown in FIG. 4A, with the resulting variation in colored material 290 distribution in the finished part 255 (i.e., after press-forming) shown in FIG. 4B. As shown, the highest density portion (the medial side portion 260) has a more dense distribution of colored material 290, and therefor appears more colored, than the lower density lateral side portion 265 or the lowest density central portion 280. In various embodiments the coloring material 290, or materials, may be selected to provide any appropriate bold or subtle contrast between the polymeric foamed material providing the structure of the part and the coloring material used to provide the visual indication of the density distribution.

Figure 5:
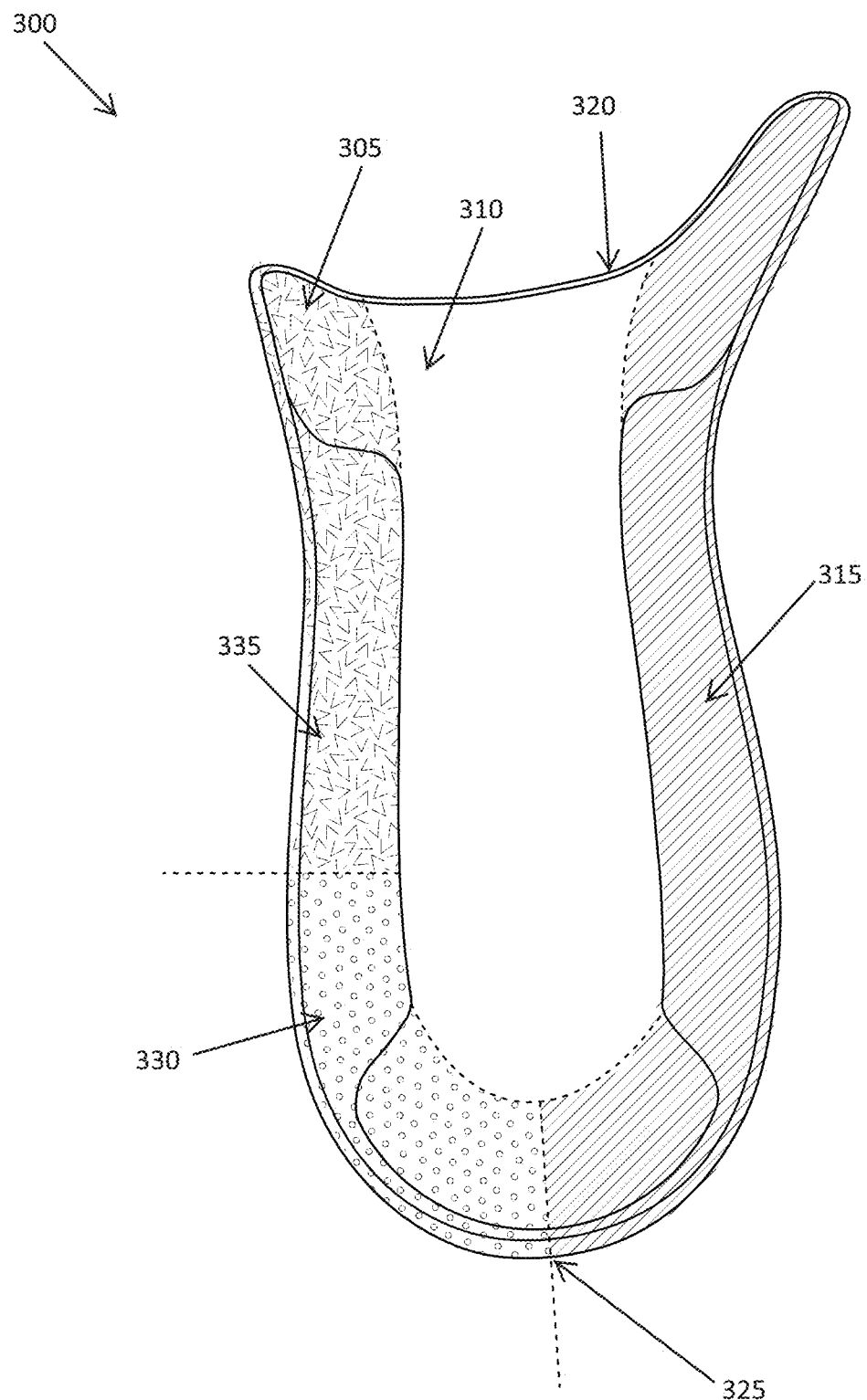
FIG. 5 is a top view of a sole element for an article of footwear, in accordance with one embodiment of the invention.

An example midsole component 300 having a plurality of regions of differing density can be seen in FIG. 5. In this embodiment, the midsole component includes a raised perimeter portion 305 surrounding a central base region 310. The raised perimeter portion 305 includes a medial side region 315 (which extends from the leading edge 320 of the midsole component 300 in a midfoot portion of the sole to the rear 325 of the midsole component 300 at the heel of the sole. A lateral heel portion 330 extends from the rear 325 of the midsole component 300 around to a lateral side portion 335, which extends along the lateral side of the midsole component 300 from the lateral heel portion 330 to the leading edge 320 of the midsole component 300. In the embodiment of FIG. 5 the medial side region 315 extends further forward (towards a forefoot) than the lateral side portion 335. In alternative embodiments the medial side region 315 and lateral side portion 335 may extend the same distance, or the lateral side portion 335 may extend further forward. In various embodiments the leading edge 320 of the midsole component 300 may be positioned at any distance along the length of the shoe and, for example, may be located within the heel, between the midfoot and heel, within the midfoot, between the midfoot and forefoot, or within the forefoot. In one embodiment the midsole component 300 may extend the full length of the shoe. In another embodiment the midsole component 300 may be located within any portion of the heel, midfoot, and/or forefoot of the shoe, and may cover any appropriate portion of the medial, lateral, and central portions of the shoe within those regions.

In the embodiment of FIG. 5 each of the perimeter regions (i.e., the medial side region 315, the lateral heel portion 330, and the lateral side portion 335) may have a different maximum density, with the density either constant or varying within each of these regions. In addition, the central base region 310 may have a maximum density equal to, or substantially equal to, a density of one of the perimeter regions, or have a different maximum density from each of the perimeter regions. Again, the density of the central base region 310 may be constant across its full extent or vary across its area.

In one embodiment the maximum density within the medial side region 315, is greater than the maximum density within any other region of the midsole component 300. This may be beneficial, for example, in providing support for the medial side of a wearer's foot to control pronation. In one embodiment the maximum density within the lateral heel portion 330 may be lower than that of the other perimeter regions. This may be beneficial, for example, in providing a more flexible cushioning for the foot of the wearer during initial footstrike within a gait cycle (where the lateral heel of the foot is often the first contact point between foot and ground during a running or walking motion.

In an alternative embodiment the perimeter portion 305 of the midsole component 300 may be divided into any number of perimeter sections, with differing density profiles within each section, depending upon the specific performance characteristics of the midsole component 300 required for a particular shoe. For example, the perimeter portion 305 may be configured as a single section having one set density, or a single section having a smoothly varying density profile within localized maximum and minimum densities in targeted areas. Alternatively the perimeter section 305 can include any number of discrete sections with stepped or smoothly transitioning densities between each section. For example, the perimeter section 305 may be configured to include one or more medial side portion, one or more lateral side portion, and/or one or more heel portion (e.g., one or more medial heel portion and one or more lateral heel portion). The transitions between these regions may be located at any appropriate positions along the perimeter 305.

Similarly, the central base portion 310 may be configured as a single section having one set density, or a single section having a smoothly varying density profile within localized maximum and minimum densities in targeted areas. Alternatively the central base portion 310 may comprise any number of discrete sections with stepped or smoothly transitioning densities between each section.

Figures 6A, 6B, 6C:
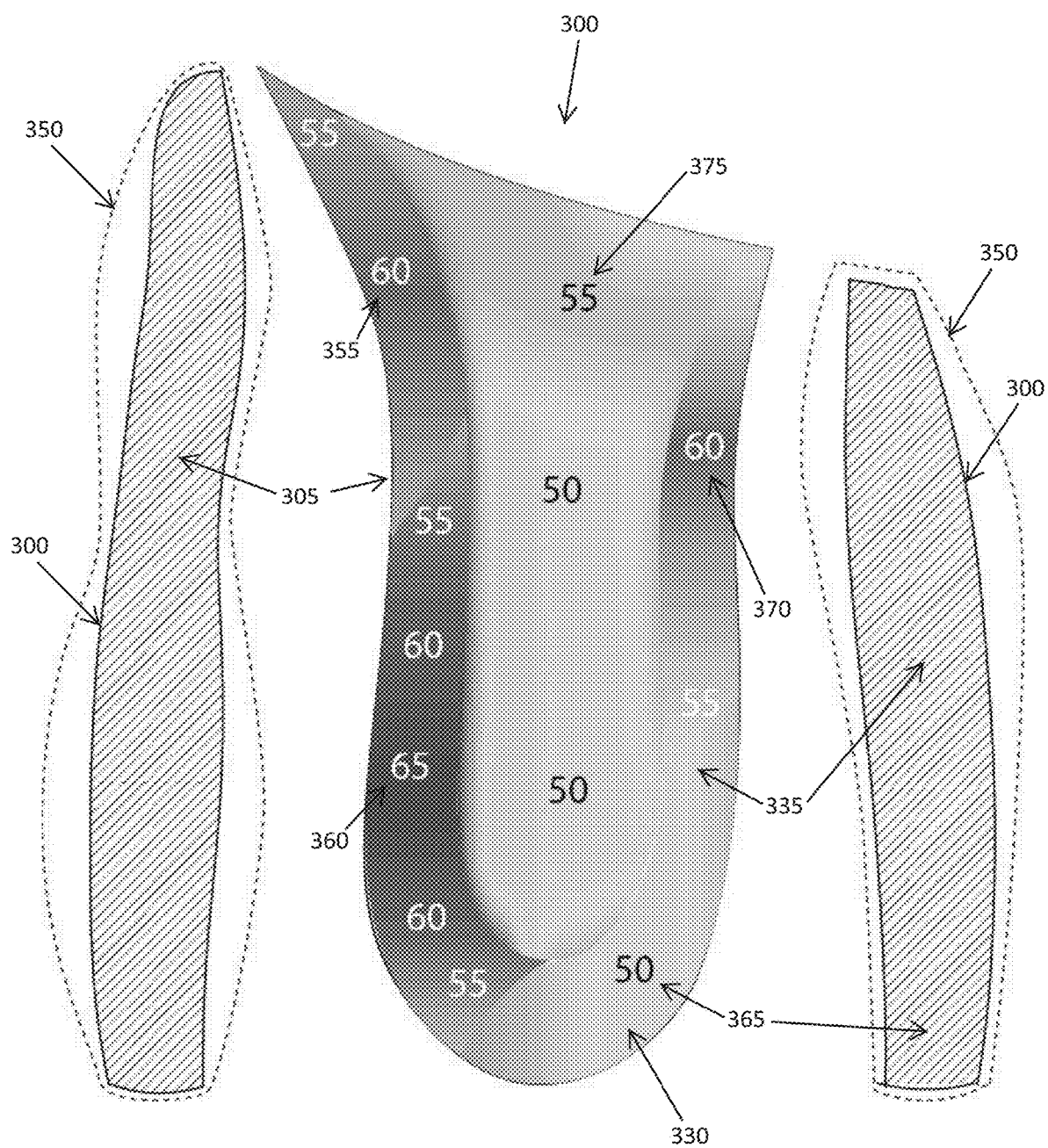
FIG. 6A is a top view of another sole element for an article of footwear, in accordance with one embodiment of the invention.
FIG. 6B is a medial side view of the sole element of FIG. 6A before and after press molding.
FIG. 6C is a lateral side view of the sole element of FIG. 6A before and after press molding.

An example hardness distribution for a midsole component 300 is shown in FIGS. 6A to 6C, with regions or high hardness corresponding to regions of higher density. FIG. 6A shows a plan view of the midsole component 300 with an indication of the hardness of the material in various regions of the midsole component 300 highlighted in Asker-C hardness units. Side views of the medial side and lateral side the midsole component 300 are shown in FIGS. 6B and 6C respectively, with the shape of the preform 350 used in the formation of the variable density/hardness distribution of the finished part 300 indicated. As shown, the midsole component 300 has a medial side region 315 with a hardness and density that varies smoothly across its length, with a first local maximum 355 in a midfoot region (to support an arch of a wearer) and a second local maximum 360 in a medial heel region. The medial side region 315 extends around the medial heel portion to the rear 325 (i.e., the back of the heel) of the midsole component 300 and transitions (or blends) into the lateral heel portion 330, which has a lower density and hardness than the medial side region 315 with a localized minimum 365. The lateral heel portion 330 then blends into the lateral side portion 335, which has a larger maximum density and hardness than the lateral heel portion 330 at a localized maximum 370. The maximum density and hardness within the lateral side portion 335 is less than that of the medial side region 315.

As shown, the central base region 310 has a localized maximum density and hardness 375 within the midfoot region (i.e., near the leading edge 320 and positioned below an arch of a wearer), with the heel region of the central base region 310 having a lower density and hardness (to provide more cushioning under the heel of the wearer).

In various embodiments the maximum and minimum hardness's and densities of the various regions of the midsole component 300 may be larger or smaller than that shown (depending upon the polymeric material used and the level of compression applied during the press-forming process) and the hardness, for example, may range between 40-80 Asker C hardness, or more particularly 50-70 Asker C hardness. In addition, selective press-forming (through variation in the shape of the preform and/or variation in the pressure applied in different regions during press-forming) can be used to produce any appropriate smoothly varying and/or stepped variation in hardness and density throughout the midsole component 300.

Figure 7A:
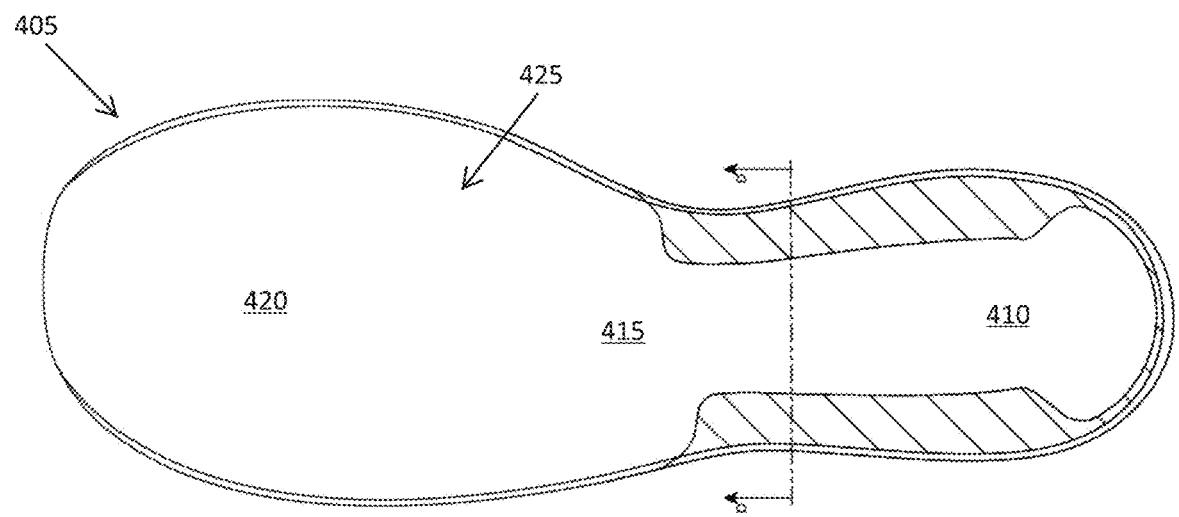
FIG. 7A is a top view of a midsole for an article of footwear incorporating a multi-density midsole element, in accordance with one embodiment of the invention.
Figure 7B:
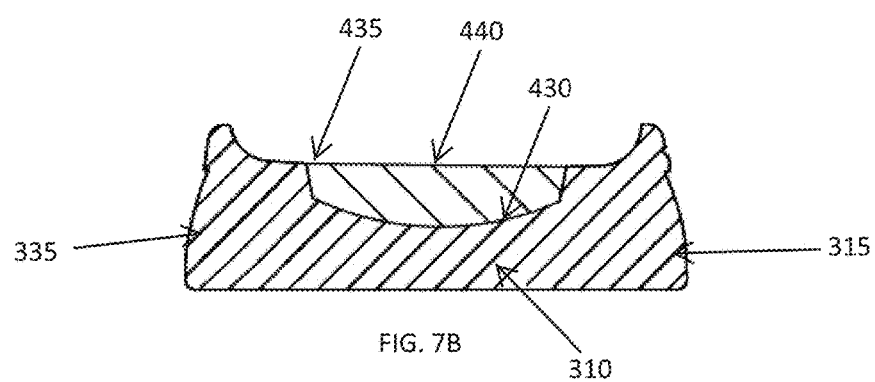
FIG. 7B is a sectional side view of the sole element of FIG. 7A through Section D-D.
Figure 8:
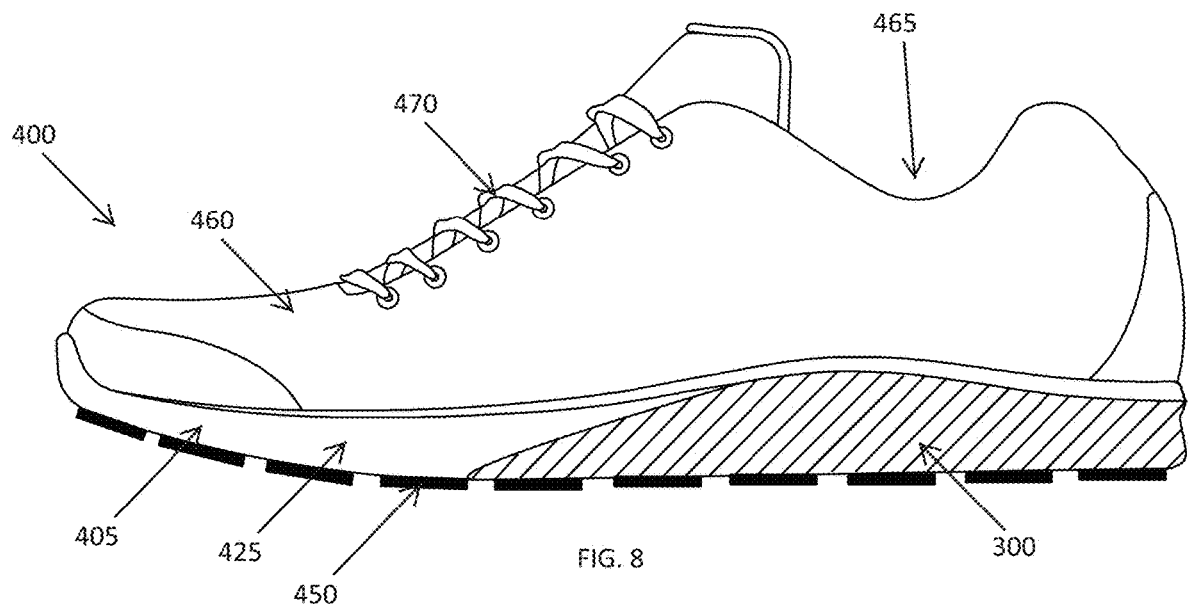
FIG. 8 is a side view of a shoe incorporating the midsole of FIGS. 7A and 7B, in accordance with one embodiment of the invention.

In one embodiment the midsole component 300 can mate with one or more additional midsole components to form a full midsole for a shoe. An example sole for a shoe 400 including a two component midsole 405 is shown in FIGS. 7A through 8. In this embodiment, the midsole component 300 forms a lower portion of the midsole 405 within the heel 410 and midfoot 415 of the shoe 400. An upper midsole component 425 mates to the upper surface 430 of the central base region 310 of the midsole component 300, with the upper midsole component 425 extending into the forefoot 420 of the shoe 400 to form a forefoot portion of the midsole 405. The upper surface of the midsole 435 is formed by the upper surface of the upper midsole component 440 and, in the perimeter regions of the medial and lateral midfoot/heel region, the upper surface of the medial side region 315 and the lateral side region 335. The upper midsole component 425 may, in certain embodiments, be formed from a softer or less dense material (e.g., a softer EVA foam) than the midsole component 300, and can therefore provide a softer, more cushioned surface for the foot of the wearer to rest on, while the perimeter regions of the midsole component 300 can provide additional support for the foot on the lateral and/or medial sides.

In one embodiment the midsole component 300 and the upper midsole component 425 is bonded together by a cementing system (e.g., an adhesive bonding agent) such as, but not limited to, a urethane, silicone, or EVA-based cementing system, or the like. In alternative embodiments the midsole component 300 and the upper midsole component 425 may be connected through any appropriate chemical and/or mechanical mechanisms, or may be co-molded into a unitary midsole 400 in a molding process. In a further alternative embodiment the midsole component 300 and the upper midsole component 425 may not be bonded together, but may rather conformingly mate together without the need for a separate bonding material, with, in one embodiment, the upper midsole component 425 being potentially removable from the midsole component 300.

In one embodiment one or more outsole elements 450 (e.g., a ground contacting rubber) can be bonded or otherwise affixed to a lower surface of the midsole 405 to form a ground contacting surface for the shoe 400. In another embodiment the midsole component 300 and the upper midsole component 425 can be formed from ground-contact EVA, thereby allowing the bottom surface of the midsole 405 to function as a ground contacting surface without the need for additional outsole elements. In one embodiment the upper surface of the midsole 435 can function as a foot contacting surface which directly contacts the foot of a wearer. In an alternative embodiment one or more additional elements, e.g., an insole and/or a strobel board, may be located between the upper surface of the midsole 435 and the foot of a wearer.

In an alternative embodiment the midsole 405 may be formed as a single unitary component having a variable density distribution configured therein. In a further alternative embodiment the midsole may include three or more separate elements with, for example, separate variable density components within the heel, midfoot and/or forefoot sections (with a cushioning element joining these components) to provide separate controlled support and cushioning within different regions of the sole. In a further alternative embodiment the midsole 405 may include separate variable-density components in the medial and lateral sides, or having variable density components only in one of a medial side, lateral side, or heel of the sole.

In one embodiment the methods described herein may be utilized to produce a variable density insole for an article of footwear, where the insole can be configured with any appropriate density distribution to provide appropriate levels of support and cushioning to different regions of a foot. Alternatively, the methods described herein may be utilized to produce a variable density insert for locating within a portion of an interior of a shoe (e.g., in a heel, midfoot, and/or forefoot region) to provide a removable insert for providing targeted support and/or cushioning for a wearer. The insert may, in various embodiments, be located within a midsole of the shoe, or be located above the midsole of a shoe as an insole component or as a separate element to be placed above the insole.

In one embodiment a variable density midsole component may be located within a forefoot of a shoe. This may be advantageous, for example, in producing wedged elements in a lateral forefoot region which can be beneficial in supporting cutting-type movements of an athlete. In various embodiments any lateral and/or medial wedge elements may be formed using the methods described herein.

The shoe 400 includes an upper 460 having a foot opening 465 and a fastening mechanism including laces 470. In alternative embodiments the shoe 400 may have any appropriate form of closing mechanism and, or be of any appropriate form (e.g., a boot, an athletic shoe, a work shoe, a flip-flop, a flat, a high heeled shoe, etc.).

In one embodiment a sole element for a shoe, and for example an athletic shoe such as a training shoe or cleated shoe, can include a variable density/hardness component formed as a perimeter portion extending through a plurality of regions of the shoe (e.g., within a medial midfoot, heel, and lateral midfoot region). In one embodiment the variable-density perimeter element(s) can extend into a forefoot region of the sole and may, in one embodiment, form a closed perimeter extending around the entire perimeter of the sole. In one embodiment the variable-density/hardness perimeter element can be formed with a base region extending in a bottom region of the sole, with a cushioning element (e.g., an upper midsole component) placed above the base region and being surrounded by the perimeter region. In another embodiment the variable-density/hardness perimeter element(s) does not have a base region, with an entire central region of the sole formed by one or more separate cushioning element/upper midsole component. The cushioning element can extend to a same height as the perimeter region or extend over a top surface of the perimeter region. In cleated embodiment, the cleats may extend from a bottom of the variable-density/hardness perimeter element, from the bottom of the base region, and/or from the bottom of the cushioning element/upper midsole component. Alternatively, one or more plates with one or more cleats attached thereto (and/or integrally formed therewith) can be attached to a bottom surface of the variable-density/hardness perimeter element, base region, and/or cushioning element/upper midsole component.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method of manufacturing a sole element for an article of footwear, the method comprising the steps of:
    forming a sole element preform;
    inserting the sole element preform into a press mold cavity; and
    press-forming the sole element preform within the press mold cavity to form a finished sole element comprising:
        a medial heel portion comprising a first maximum density;
        a lateral heel portion comprising a second maximum density; and
        a central heel portion extending between at least a portion of the medial heel portion and lateral heel portion, the central heel portion comprising a third maximum density,
        wherein the medial heel portion, lateral heel portion, and central heel portion comprise a unitary construction, and
        wherein a height of the central heel portion is less than a height of each of the medial heel portion and the lateral heel portion with a first stepped transition between the medial heel portion and the central heel portion and a second stepped transition between central heel portion and the lateral heel portion.

2. The method of claim 1, wherein the first maximum density is less than the second maximum density.

3. The method of claim 1, wherein at least one of the medial heel portion and lateral heel portion comprises a density that varies in at least one direction.

4. The method of claim 1, wherein the medial heel portion comprises a lateral extension and the lateral heel portion comprises a medial extension.

5. The method of claim 1, wherein the central heel portion comprises at least one cavity.

6. The method of claim 1, wherein the sole element comprises a midsole of the article of footwear, the midsole comprising a heel region, a midfoot region, and a forefoot region.

7. The method of claim 6, wherein the midsole extends a full length of the article of footwear.

8. The method of claim 1, wherein at least one of a top surface and a bottom surface of the central heel portion comprises at least one indentation.

9. The method of claim 8, wherein the at least one indentation comprises a flexibility groove.

10. The method of claim 1, wherein a top surface of at least one of the medial heel portion, the lateral heel portion, and the central heel portion comprises at least one indentation.

11. A sole element for an article of footwear comprising:
    a medial heel portion comprising a first maximum density;
    a lateral heel portion comprising a second maximum density; and
    a central heel portion comprising a third maximum density and extending between at least a portion of the medial heel portion and lateral heel portion and wherein the medial heel portion, lateral heel portion and, and central heel portion comprise a unitary construction, and wherein a height of the central heel portion is less than a height of each of the medial heel portion and the lateral heel portion with a first stepped transition between the medial heel portion and the central heel portion and a second stepped transition between central heel portion and the lateral heel portion.

12. The sole element of claim 11, wherein the first maximum density is less than the second maximum density.

13. The sole element of claim 11, wherein at least one of the medial heel portion and lateral heel portion comprises a density that varies in at least one direction.

14. The sole element claim 11, wherein the medial heel portion comprises a lateral extension and the lateral heel portion comprises a medial extension.

15. The sole element of claim 11, wherein the central heel portion comprises at least one cavity.

16. The sole element of claim 11, wherein the sole element comprises a midsole of the article of footwear, the midsole comprising a heel region, a midfoot region, and a forefoot region.

17. The sole element of claim 16, wherein the midsole extends a full length of the article of footwear.

18. The sole element of claim 11, wherein at least one of a top surface and a bottom surface of the central heel portion comprises at least one indentation.

19. The sole element of claim 18, wherein the at least one indentation comprises a flexibility groove.

20. The sole element of claim 11, wherein a top surface of at least one of the medial heel portion, the lateral heel portion, and the central heel portion region comprises at least one indentation.

* * * * *